(12) United States Patent
Xu et al.

(10) Patent No.: US 8,395,286 B2
(45) Date of Patent: Mar. 12, 2013

(54) LINEAR VIBRATOR

(75) Inventors: Hong-Fu Xu, Shenzhen (CN); Le-Ping Dong, Shenzhen (CN); Wei Zhang, Shenzhen (CN)

(73) Assignees: AAC Acoustic Technologies (Shenzhen) Co., Ltd., Shenzhen (CN); American Audio Components Inc., La Verne, CA (US)

( * ) Notice: Subject to any disclaimer, the term of this patent is extended or adjusted under 35 U.S.C. 154(b) by 336 days.

(21) Appl. No.: 12/858,277

(22) Filed: Aug. 17, 2010

(65) Prior Publication Data

US 2011/0227427 A1  Sep. 22, 2011

(30) Foreign Application Priority Data

Mar. 22, 2010  (CN) .................. 2010 2 0138931 U

(51) Int. Cl.
*H02K 33/00* (2006.01)
(52) U.S. Cl. ................ 310/14; 310/12.16; 310/15

(58) Field of Classification Search ............... 310/14, 310/15, 23, 12.16; 381/417
See application file for complete search history.

(56) References Cited

U.S. PATENT DOCUMENTS

| | | | | |
|---|---|---|---|---|
| 5,528,697 | A * | 6/1996 | Saito ............... | 381/396 |
| 8,120,214 | B2 * | 2/2012 | Jeon ................ | 310/15 |
| 2007/0236088 | A1 * | 10/2007 | Miura .............. | 310/15 |
| 2010/0052578 | A1 * | 3/2010 | Kim ................. | 318/114 |
| 2010/0327672 | A1 * | 12/2010 | Roberts ........... | 310/25 |

* cited by examiner

*Primary Examiner* — Nguyen N Hanh
(74) *Attorney, Agent, or Firm* — IPro, Inc.; Na Xu

(57) ABSTRACT

The linear vibrator includes a base forming a hollow space, a suspension fixed on the base, and an oscillating portion suspended in the hollow space by the suspension. The suspension defines a flat part, a connecting portion bent downward from the flat part, and a spring portion extended horizontally in a direction parallel to flat part from the end of the connecting portion. The suspension is directly connected with the outside component, thereby transmitting the vibration to the outside component rapidly.

24 Claims, 5 Drawing Sheets

LINEAR VIBRATOR

FIELD OF THE INVENTION

The present disclosure relates to linear vibrators and, more particularly, to a linear vibrator having a suspension.

DESCRIPTION OF RELATED ART

A linear vibrator may be used in various electronic equipments such as mobile communication terminals. Representatively, such a linear vibrator performs a vibration function for informing signal arrival and signal input in the portable communication terminals.

A typical linear vibrator, for transmitting a vibration to an outside component, includes a cover directly connected with the outside component, a base forming a hollow space together with the cover, a magnetic system attached on the base, a plate suspension fixed on the base, and an oscillating portion suspended in the hollow space by the plate suspension. However, the typical linear vibrator can not transmit the vibration to the outside component rapidly and the height of the liner vibrator is increased.

The present invention is provided to solve the problems mentioned above.

SUMMARY OF THE INVENTION

In one embodiment of the invention, a linear vibrator includes a base forming a hollow space, a suspension fixed on the base, and an oscillating portion suspended in the hollow space by the suspension. The suspension defines a flat part, a connecting portion bent downward from the flat part, and a spring portion extended horizontally in a direction parallel to flat part from the end of the connecting portion.

In an alternative embodiment of the invention, a linear vibrator includes a base forming a hollow space, a suspension fixed on the base and defined a flat part, a pair of connecting portion bent downward from the flat part, a projecting portion connected with the end of the connecting portion and protruded horizontally in the direction orthogonal to the axis of the linear vibrator, a spring portion separated from the projecting portion and engaged with the projecting portion, and an oscillating portion attached on the suspension.

Other features of the present invention will become more apparent to those skilled in the art upon examination of the following drawings and detailed description of exemplary embodiments.

DETAILED DESCRIPTION OF THE EXEMPLARY EMBODIMENTS

Reference will now be made to describe the exemplary embodiments of the present invention in detail.

Figure 1:
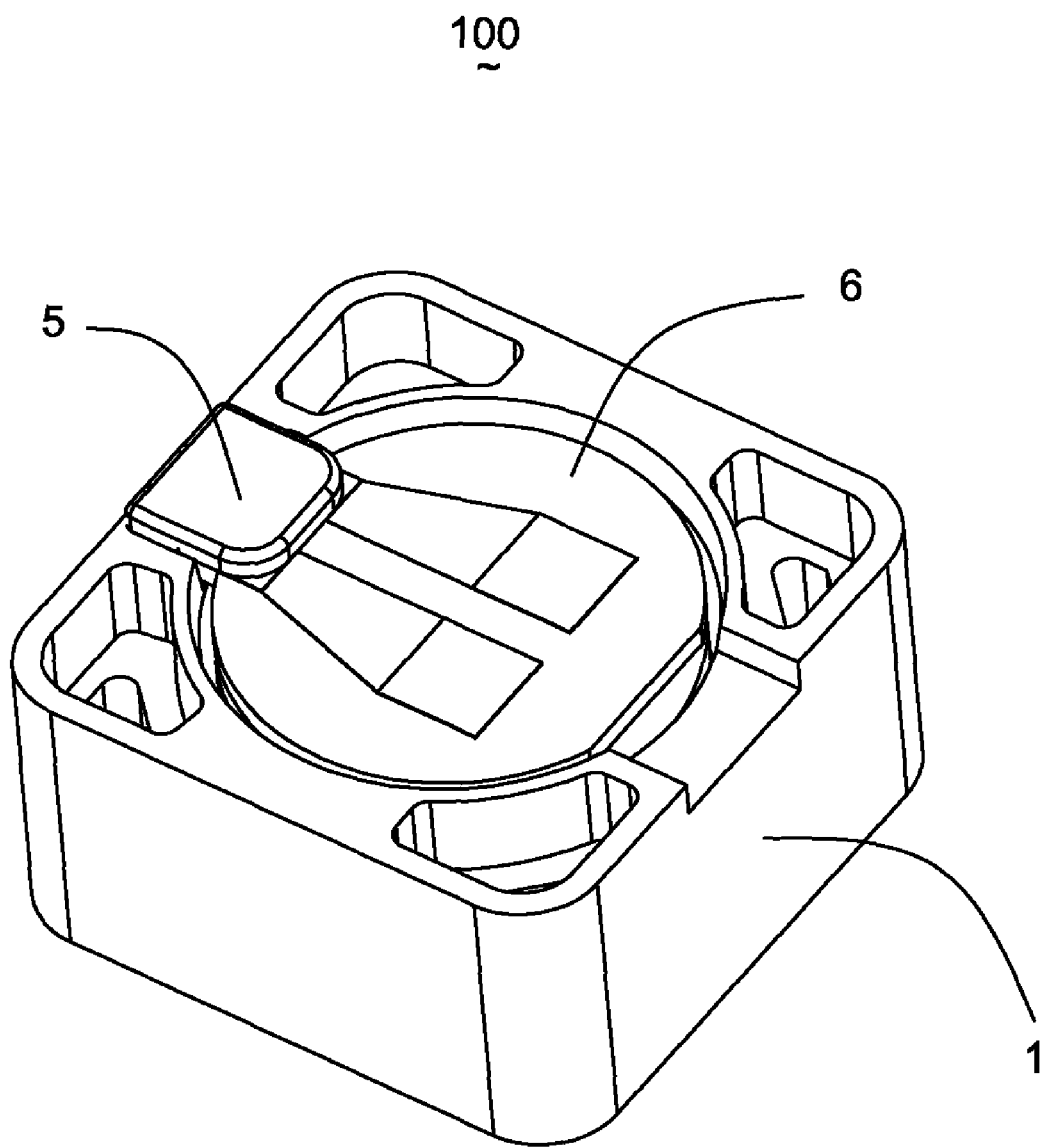
FIG. 1 is an isometric view of a linear vibrator according to a first exemplary embodiment of the present invention.
Figure 2:
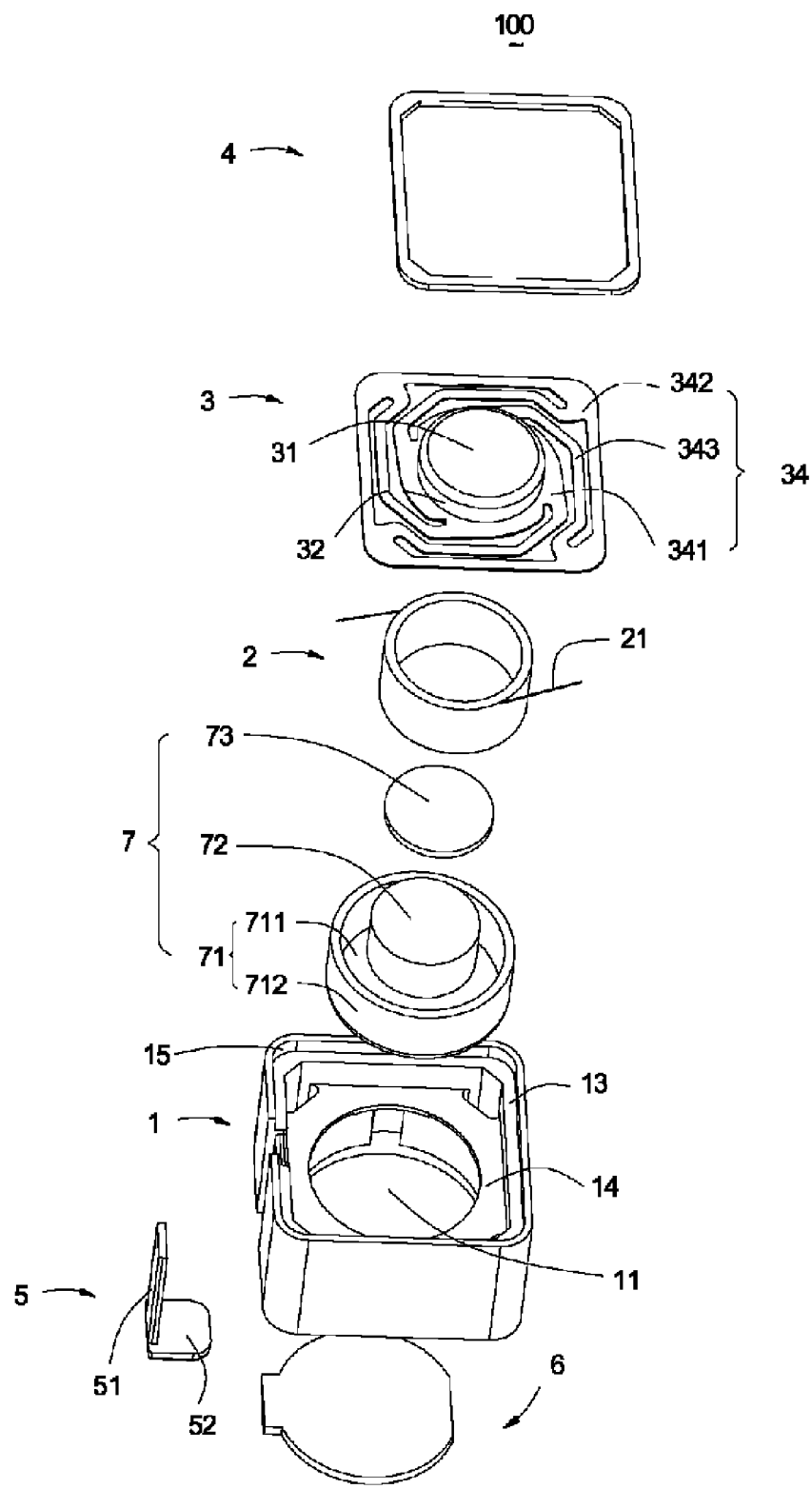
FIG. 2 is an exploded view of the linear vibrator in FIG. 1.
Figure 3:
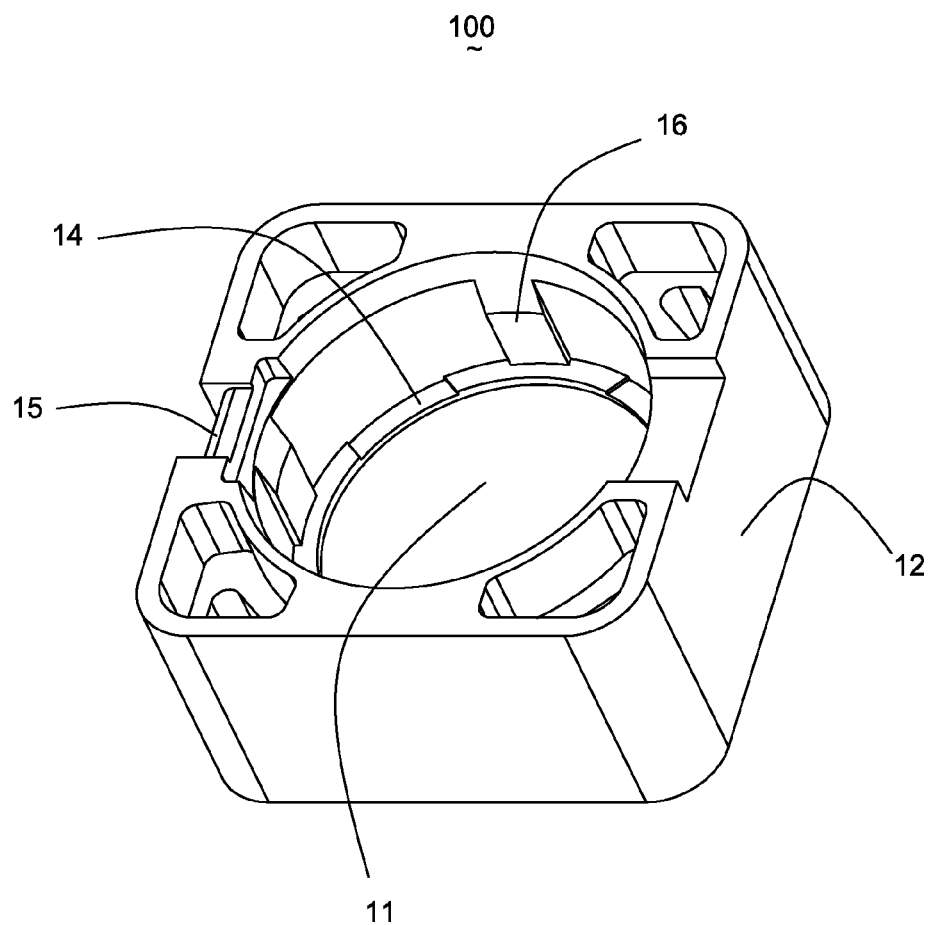
FIG. 3 is an isometric view of a base of the linear vibrator according to the first exemplary embodiment of the present invention.

Referring to FIGS. 1 to 3, a linear vibrator 100 in accordance with a first exemplary embodiment of the present invention comprises a base 1 forming a hollow space 11, a cylindrical voice coil 2 received in the hollow space 11, a suspension 3 fixed on the base 1 and resiliently supporting the voice coil 2, a securing plate 4 mounted on the base 1 for securing to the suspension 3, a contact 5 received in the base 1, a PCB 6 attached on the base 11 and connected with the contact 5 for supplying an alternating current to the linear vibrator 100, and a magnetic system 7 mounted on the PCB 6 and received in the hollow space 11.

The voice coil 2 defines a pair of terminals 21 for receiving alternating currents from out source.

The magnetic system 7 defines a cup-shaped yoke 71 placed coaxially with respect to the voice coil 2. The magnetic system 7 further defines a magnet 72 and a top plate 73 successively stacked in the yoke 71 in coaxial relation to the voice coil 2. The yoke 71 defines a bottom portion 711 for fixing the magnet 72 firmly and a lateral 712 extending from the bottom portion 711 for engaging with the base 1. The voice coil 2 is inserted into a magnetic gap (no labeled) between the outer peripheral surface of the magnet 72 and the inner peripheral surface of the yoke 71.

The base 1 is coaxial with respect to the voice coil 2 and defines a plurality of sidewalls 12 for forming a hollow space 11 and an opening 15 communicating with the hollow space 11, a step portion 13 extending from the inner peripheral surface of the sidewalls 12 toward the outer peripheral surface of the sidewalls 12 at an upper end thereof for holding the securing plate 4, a plurality of engaging portions 16 extending from the inner peripheral surface of the sidewalls 14 toward the hollow space 11 at a lower end for engaging with the lateral 712 of the yoke 71, and a protruding portion 14 protruding from the upper end of the engaging portion 16 toward the hollow space 11 for limiting the movement of the yoke 7 toward the suspension 3. The sidewalls 12 of the base 1 define a receiving groove 15 extending from the outer peripheral surface thereof toward the inner peripheral surface thereof for receiving the contact 5.

The securing plate 4, ring-shaped, is mounted on the step portion 13. While assembled, the suspension 3 is sandwiched between the step portion 13 and the securing plate 4.

The suspension 3 defines a flat part 31 orthogonal to the axis of the voice coil 2 and exposed out of the opening 15 for directly connecting with an outside component, a connecting portion 32 bent downward from the flat part 31, and a spring portion 34 extended horizontally in the direction orthogonal to the axis of the linear vibrator 100 from the end of the connecting portion 32. The spring portion 34 defines an inner ring portion 341 connected with the connecting portion 32, an outer ring portion 342, and a plurality of arcuate portions 343 connected with the inner and outer ring portions 341 and 342 and set in a space between these ring portions 341 and 342, respectively. At least a part of the connecting portion 32 is projected from the opening 15.

The contact 5 defines a fixing portion 51 retained in the receiving groove 15 of the base 1 and a soldering portion 52 bent from the fixing portion 51 for being soldered on the PCB 6. The soldering portion 52 is configured to be a plate.

Figure 4:
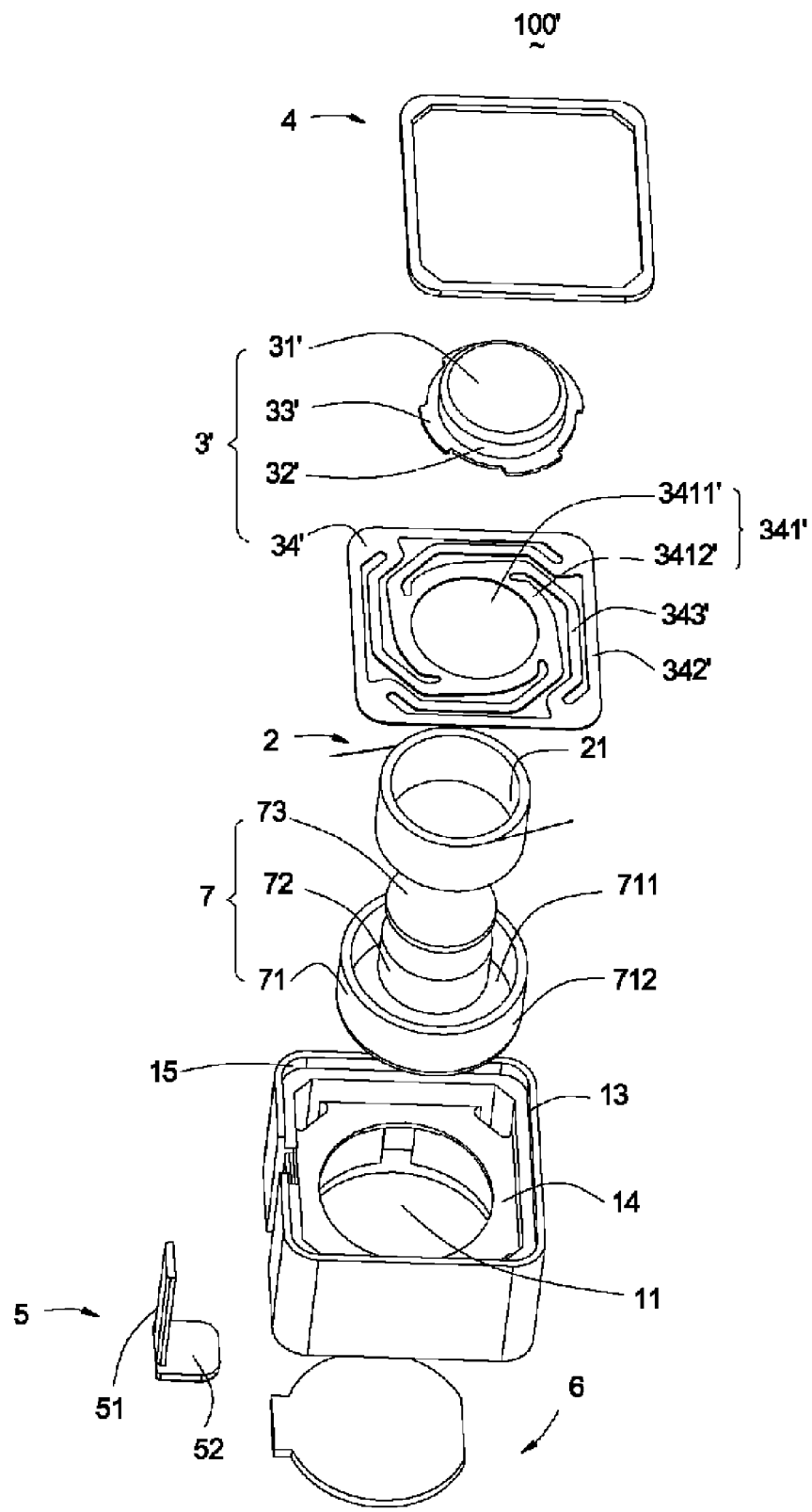
FIG. 4 is an exploded view of a linear vibrator according to a second exemplary embodiment of the present invention.
Figure 5:
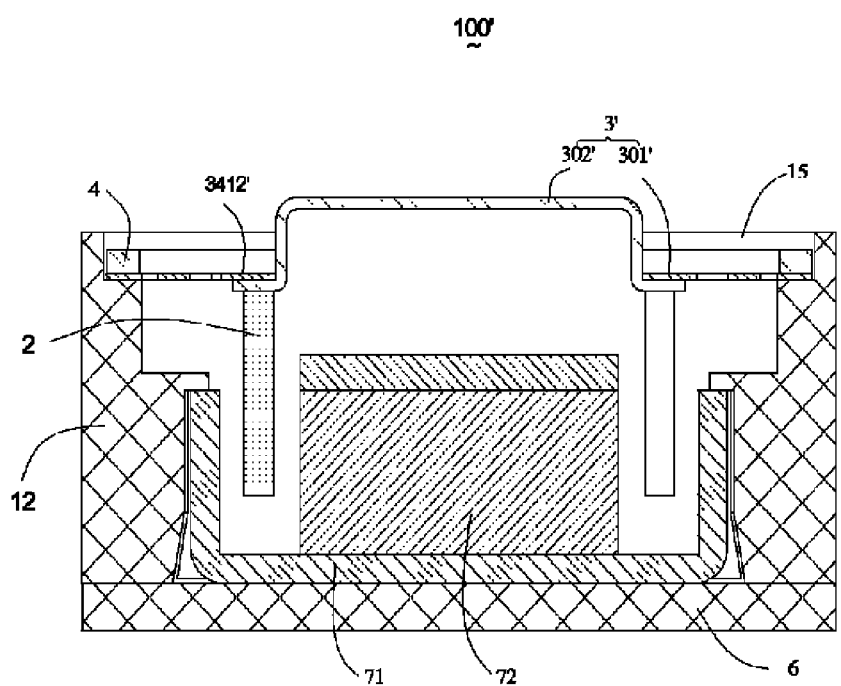
FIG. 5 is an enlarged cross-sectional view of FIG. 4.

FIGS. 4 and 5 illustrates a linear vibrator 100' in accordance with a second exemplary embodiment of the present invention.

The suspension 3' is divided into two parts. One part 302', separating from another part 301', defines a flat part 31', a pair of connecting portion 32' bent downward from the flat part 31', a plurality of projecting portions 33' connected with the end of the connecting portion 32' and protruded out of the periphery of the connecting portion 32' in the direction orthogonal to the axis of the linear vibrator 100'. Another part 301' defines a spring portion 34' located on an upper surface of the projecting portion 33' and parallel to the flat part 31'. An oscillating portion 2' attached to a lower surface of the projecting portion 33' opposite to the upper surface and adapted to vibrate along an axial direction of the linear vibrator 100'. The spring portion 34' defines an inner ring portion 341' for abutting against the upper surface of the projecting portion 33', an outer ring portion 342' having a diameter that is larger than that of the inner ring portion 341', and a plurality of arcuate portions 343' connected with the inner and outer ring portions 341' and 342' and set in a space between these ring portions 341' and 342', respectively. Each projecting portion 33' is separated from others. The inner ring portion 341' has a through hole 3411' for receiving the connecting portion 32' and a surrounding portion 3412' surrounding the through hole 3411' and connected with an upper surface of the projection portion 33'. When assembled, the connecting portion 32' is inserted into the through hole 3411' and the projecting portion 33' is connected with a lower surface of the surrounding portion 3412', thereby reducing the height of the linear vibrator.

It is understood that in an alternative exemplary embodiment, the upper surface of the spring portion engages with the lower surface of the projecting portion and the lower surface of the spring portion fixes the oscillating portion.

According to the aforementioned linear vibrator, the suspension is directly connected with the outside component, thereby transmitting the vibration to the outside component rapidly. Another advantage of this invention is that the height of the linear vibrator can be reduced. In addition, the suspension is divided into two parts. One part connects with the outside component for transmitting the vibration to the outside component and another part flexibly supports the oscillating portion for preventing the deformation of the flat part when the oscillating portion vibrates in the axial direction of the linear vibrator.

While the present invention has been described with reference to the specific embodiments, the description of the invention is illustrative and is not to be construed as limiting the invention. Various of modifications to the present invention can be made to the exemplary embodiments by those skilled in the art without departing from the true spirit and scope of the invention as defined by the appended claims.

What is claimed is:

1. A linear vibrator comprising:
    a base having a plurality of sidewalls for forming a hollow space and an opening communicating with the hollow space;
    a suspension fixed on the sidewalls of the base;
    an oscillating portion suspended in the hollow space by the suspension;
    wherein, the suspension defines a flat part exposed out of the opening for directly connecting with an outside component, a connecting portion bent downward from the flat part, and a spring portion extended horizontally in a direction orthogonal to an axis of the linear vibrator from the end of the connecting portion.

2. The linear vibrator as described in claim 1, wherein the spring portion defines an inner ring portion, an outer ring portion, and a plurality of arcuate portions connected with the inner and outer ring portions and set in a space between these ring portions, respectively.

3. The linear vibrator as described in claim 2, wherein the linear vibrator defines a magnetic system having a yoke and a magnet successively stacked in the yoke.

4. The linear vibrator as described in claim 2, wherein the connecting portion connecting with the inner ring portion.

5. The linear vibrator as described in claim 1, wherein the base further defines a plurality of engaging portions extending from the inner peripheral surface toward the hollow space at a lower end for engaging with the lateral of the yoke and a protruding portion protruding from the engaging portion for limiting the movement of the yoke towards the suspension.

6. The linear vibrator as described in claim 5, wherein the base further defines a step portion extending from the inner peripheral surface of the sidewalls toward the outer peripheral surface of the sidewalls at an upper end thereof.

7. The linear vibrator as described in claim 6, wherein the linear vibrator defines a securing plate mounted on the step portion for fixing the suspension on the step portion firmly.

8. The linear vibrator as described in claim 7, wherein the linear vibrator further defines a contact and a PCB connected with the contact.

9. The linear vibrator as described in claim 8, wherein the base defines a receiving groove extending from the outer peripheral surface thereof toward the inner peripheral surface thereof for receiving the contact and the contact defines a fixing portion retained in the receiving groove of the base and a soldering portion bent from the fixing portion for being soldered on the PCB.

10. The linear vibrator as described in claim 9, wherein the soldering portion is configured to be a plate.

11. The linear vibrator as described in claim 1, wherein at least a part of the connecting portion is projected from the opening.

12. A linear vibrator comprising:
    a base having a plurality of sidewalls for forming a hollow space and an opening communicating with the hollow space;
    a suspension fixed on the sidewalls of the base and defined a flat part exposed out of the opening for directly connecting with an outside component, a connecting portion bent downward from the flat part, a projecting portion connected with the connecting portion and protruded out of the periphery of the connecting portion in the direction orthogonal to the axis of the linear vibrator, and a spring portion separated from the projecting portion and engaged with the projecting portion;
    an oscillating portion attached on the suspension.

13. The linear vibrator as described in claim 12, wherein the spring portion is parallel to the flat part.

14. The linear vibrator as described in claim 13, wherein the linear vibrator defines a magnetic system having a yoke and a magnet successively stacked in the yoke in coaxial relation to the oscillating portion.

15. The linear vibrator as described in claim 12, the spring portion defines an inner ring portion for abutting against the upper surface of the projecting portion, an outer ring portion having a diameter that is larger than that of the inner ring portion, and a plurality of arcuate portions connected with the inner and outer ring portions and set in a space between these ring portions, respectively.

16. The linear vibrator as described in claim 15, wherein the inner ring portion has a through hole for receiving the connecting portion and a surrounding portion surrounding the through hole and connected with an upper surface of the projection portion.

17. The linear vibrator as described in claim 12, wherein the base further defines a protruding portion extending from the inner peripheral surface toward the hollow space for limiting the movement of the yoke toward the suspension.

18. The linear vibrator as described in claim 17, wherein the base further defines a plurality of engaging portions for engaging with the lateral of the yoke and the distance from the inner peripheral of protruding portion to the outer peripheral of the base is greater than that of the inner peripheral of engaging portion to the outer peripheral of the base.

19. The linear vibrator as described in claim 18, wherein the base defines a step portion extending from the inner peripheral surface of the sidewalls toward the outer peripheral surface of the sidewalls.

20. The linear vibrator as described in claim 19, wherein the linear vibrator further defines a securing plate mounted on the step portion for fixing the suspension on the step portion firmly.

21. The linear vibrator as described in claim 20, wherein each projecting portion is separated from others.

22. The linear vibrator as described in claim 21, wherein the linear vibrator further defines a contact and a PCB connected with the contact.

23. The linear vibrator as described in claim 22, wherein the base defines a receiving groove extending from the outer peripheral surface thereof toward the inner peripheral surface thereof for receiving the contact and the contact defines a fixing portion retained in the receiving groove of the base and a soldering portion bent from the fixing portion for being soldered on the PCB.

24. The linear vibrator as described in claim 12, wherein at least a part of the connecting portion is projected from the opening.

* * * * *